United States Patent
Modi et al.

(10) Patent No.: US 10,810,591 B2
(45) Date of Patent: Oct. 20, 2020

(54) VIRTUAL REALITY HEADSET DEVICE AND PAYMENT METHOD

(71) Applicant: MASTERCARD INTERNATIONAL INCORPORATED, Purchase, NY (US)

(72) Inventors: Bhargav Modi, Ahmedabad (IN); Nilambuj Singh, Pune (IN); Bejoy Lucy Mathew, Dardenne Prairie, MO (US); Steve Podgorski, Defiance, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/207,920

(22) Filed: Dec. 3, 2018

(65) Prior Publication Data

US 2019/0228417 A1 Jul. 25, 2019

(30) Foreign Application Priority Data

Jan. 23, 2018 (SG) .......................... 10201800589W

(51) Int. Cl.
*G06Q 20/32* (2012.01)
*G06Q 20/40* (2012.01)
(Continued)

(52) U.S. Cl.
CPC ..... *G06Q 20/40145* (2013.01); *G02B 27/017* (2013.01); *G06Q 20/325* (2013.01);
(Continued)

(58) Field of Classification Search
CPC ............................ G06Q 20/325; G06B 27/017
See application file for complete search history.

(56) References Cited

U.S. PATENT DOCUMENTS 9,837,043 B1 * 12/2017 Patel ....................... G09G 5/006
2015/0105014 A1 * 4/2015 Kulavik .................. H04W 4/80
455/41.1

(Continued)

FOREIGN PATENT DOCUMENTS

WO WO-2017119908 A1 * 7/2017 ......... H04L 63/0861

OTHER PUBLICATIONS

Cabonell et al., Security analysis of a new multi-party payment protocol with intermediary service, IEEE Computer Society, 2007, at least p. 699 (Year: 2007).*

*Primary Examiner* — Hani M Kazimi
*Assistant Examiner* — Adam Hilmantel
(74) *Attorney, Agent, or Firm* — Harness, Dickey & Pierce, P.L.C.

(57) ABSTRACT

A virtual reality headset device is disclosed. The virtual reality headset device comprises: a secure storage configured to store a tokenized account identifier for a payment card account; an interface configured to enable to virtual reality headset to couple to at least a first communication device and a second communication device; a computer processor; and a data storage device, the data storage device storing instructions operative by the processor to: generate a first transaction authorization request using the tokenized account identifier for the payment card account; send the first transaction authorization request over a communication network via the first communication device; generate a second transaction authorization request using the tokenized account identifier for the payment card account; and send the second transaction authorization request over a communication network via the second communication device.

19 Claims, 6 Drawing Sheets

(51) Int. Cl.
*G06Q 20/36* (2012.01)
*G02B 27/01* (2006.01)
*G06Q 20/34* (2012.01)
*G06T 19/00* (2011.01)

(52) U.S. Cl.
CPC ....... *G06Q 20/351* (2013.01); *G06Q 20/3674* (2013.01); *G06T 19/006* (2013.01); *G02B 2027/014* (2013.01)

(56) References Cited

U.S. PATENT DOCUMENTS

2016/0321653 A1* 11/2016 Jacobs ................ G06Q 20/385
2017/0262855 A1* 9/2017 Venugopalan ... G06Q 20/40145
2018/0270291 A1* 9/2018 Burton ................ H04L 43/0876
2018/0332036 A1* 11/2018 Mokhasi .......... G06Q 20/40145
2019/0028697 A1* 1/2019 Sullivan ............. G02B 27/0176

* cited by examiner

VIRTUAL REALITY HEADSET DEVICE AND PAYMENT METHOD

CROSS-REFERENCE TO RELATED APPLICATION

This application claims the benefit of and priority to Singapore Patent Application No. 10201800589W, filed Jan. 23, 2018. The entire disclosure of the above application is incorporated herein by reference.

FIELD

The present disclosure generally relates to the generation of payment transaction authorization requests and specifically to virtual reality headsets for generating payment transaction authorization requests and corresponding methods in virtual reality headsets.

BACKGROUND

This section provides background information related to the present disclosure which is not necessarily prior art.

There has been rapid growth in the use of virtual reality (VR) in recent years. Most technology predictions indicate an exponential jump in the adaptation of VR across various industries and walks of life.

Current payment processing methods are tied to devices, such as smart phones and smart watch devices, and therefore the integration of payment infrastructure into VR environments presents a number of challenges and it is difficult to present a seamless process to a user as the payment functionality may be device or operating system specific. Further, payment processing generally requires a network connection and if network connectivity is tied to a single device, the ability to make payments may be impacted by fluctuations in network connectivity.

SUMMARY

This section provides a general summary of the disclosure, and is not a comprehensive disclosure of its full scope or all of its features. Aspects and embodiments of the disclosure are set out in the accompanying claims.

According to a first aspect of the present disclosure a virtual reality headset device is provided. The virtual reality headset device comprises: a secure storage configured to store a tokenized account identifier for a payment card account; an interface configured to enable a virtual reality headset device to couple to at least a first communication device and a second communication device; a computer processor; and a data storage device, the data storage device storing instructions operative by the processor to: generate a first transaction authorization request using the tokenized account identifier for the payment card account; send the first transaction authorization request over a communication network via the first communication device; generate a second transaction authorization request using the tokenized account identifier for the payment card account; and send the second transaction authorization request over a communication network via the second communication device.

In an embodiment, the virtual reality headset device further comprises a virtual reality display configured to display virtual reality images to a user.

In an embodiment, the virtual reality headset device further comprises a biometric sensor configured to read biometric data of a user, and wherein data storage device stores further instructions operative by the processor to: generate the first and second transaction authorization requests using the biometric data of the user.

In an embodiment, the virtual reality headset device further comprises a payment card reader device, and wherein the data storage device stores further instructions operative by the processor to: read payment card data using the payment card reader device; generate the tokenized account identifier for the payment card account associated with the payment card data; and store the tokenized account identifier for a payment card account in the secure storage.

In an embodiment, the interface is a wireless communication interface.

In an embodiment, the virtual reality headset device is configured to receive a computing device comprising a display, wherein in use the display of the computing device displays virtual reality images to a user.

In an embodiment, the first payment transaction authorization request and the second payment transaction request each comprise an indication of a respective transaction amount and an indication of the tokenized payment card identifier.

In an embodiment, the data storage device stores further instructions operative by the processor to: select either the first communication device or the second communication device based on a user input.

In an embodiment, the data storage device stores further instructions operative by the processor to: select either the first communication device or the second communication device based on an indication of connection parameters of the first communication device and the second communication device.

In an embodiment, the data storage device stores further instructions operative by the processor to: receive a first transaction response in response to the first transaction authorization request, and generate an indication that the first transaction has been successful.

According to a second aspect of the present disclosure a payment method in a virtual reality headset device is provided. The method comprises: accessing a secure memory within the virtual reality headset device to retrieve a tokenized account identifier for a payment card; generating a first transaction authorization request using the tokenized account identifier for the payment card account; sending the first transaction authorization request over a communication network via a first communication device; generating a second transaction authorization request using the tokenized account identifier for the payment card account; and sending the second transaction authorization request over a communication network via a second communication device.

In an embodiment, the first communication device and the second communication device are connected to the virtual reality headset device at different times.

In an embodiment, the first communication device and the second communication device are connected to the virtual reality headset device at concurrent times.

In an embodiment, the method further comprises receiving a user input indicating a user selection of either the first communication device or the second communication device for connection to the communication network.

In an embodiment, the method further comprises receiving an indication of connection parameters of the first communication device and the second communication device and selecting either the first communication device or the second communication device for connection to the communication network based on the connection parameters.

In an embodiment, the method further comprises receiving a first transaction response in response to the first transaction authorization request, and generating an indication that a first transaction has been successful.

Embodiments of the disclosure may be expressed as a network of communicating devices (i.e., a "computerized network"). It may further be expressed in terms of a software application downloadable into a computer device to facilitate the method. The software application may be a computer program product, which may be stored on a non-transitory computer-readable medium on a tangible data-storage device (such as a storage device of a server, or one within a user device).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will now be described by way of example only with reference to the following drawings, in which.

Corresponding reference numerals indicate corresponding parts throughout the several views of the drawings.

DETAILED DESCRIPTION

Embodiments will be described, by way of example only, with reference to the drawings. The description and specific examples included herein are intended for purposes of illustration only and are not intended to limit the scope of the present disclosure.

The present disclosure relates to virtual reality devices having a secure memory which stores a tokenized payment card identifier and methods of generating payment authorization requests using such devices. As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Furthermore, the "payment card" may exist only as a data structure (i.e., without physical existence), which is registered with a digital wallet or cloud wallet.

Figure 1:
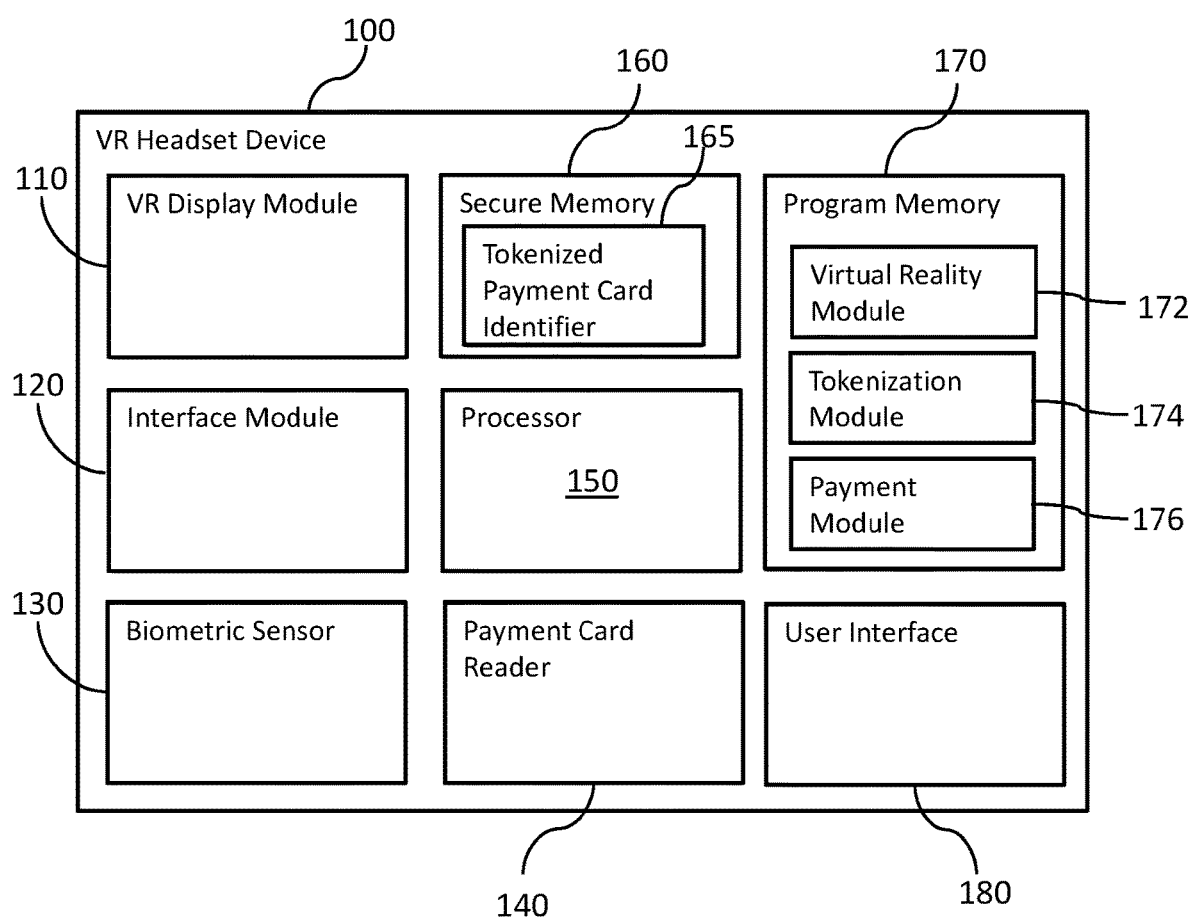
FIG. 1 is a block diagram showing a virtual reality headset device according to an embodiment of the present disclosure.

FIG. 1 is a block diagram showing a virtual reality headset according to an embodiment of the present disclosure. The virtual reality headset device 100 comprises a virtual reality display module 110, an interface module 120, a biometric sensor 130, a payment card reader 140, a processor 150, a secure memory 160, a program memory 170 and a user interface 180. The virtual reality display module 110 may be a stereoscopic display configured to display images to each eye of a user. The interface module 120 is an interface which allows the virtual reality headset device 100 to couple to a communication device, such as a smart phone or a computer connected to the internet. The interface module 120 may allow wired and/or wireless connection, for example, through universal serial bus (USB), Wi-Fi, Bluetooth or other types of information transfer protocol. The biometric sensor 130 allows biometric data of a user to be read in order to authenticate the user. The biometric sensor 130 may be a fingerprint sensor, an iris scanner or other type of biometric sensor. The processor 150 is a central processing unit (CPU) which executes instructions of a computer program by performing the basic arithmetic, logical, control and input/output (I/O) operations specified by the instructions. The secure memory 160 stores a tokenized payment card identifier 165. The secure memory 160 may require biometric authentication using the biometric sensor 130 to allow access to the tokenized payment card identifier 165. The program memory 170 stores computer program instructions which are executed by the processor 150. The program memory stores a virtual reality module 172, a tokenization module 174 and a payment module 176. The virtual reality module 172 comprises instructions to cause the virtual reality display module 110 to generate a virtual reality environment for display to a user. The tokenization module 174 comprises computer program instructions to store a tokenized payment card identifier in the secure memory 160. The payment module 176 comprises computer program instructions to generate payment authorization requests using the tokenized payment card identifier 165 stored in the secure memory 160. The user interface 180 comprises sensors or input devices which allow a user to navigate a virtual reality environment and to input commands.

In the embodiment shown in FIG. 1, the virtual reality display module 110 is shown as part of the virtual reality headset device 100, however in some embodiments, the virtual reality headset device 100 may be provided with a removable display device, for example, the interface module 120 may allow a communication with a device, such as a smart phone, which can be received in the virtual reality headset device 100 such that the smart phone forms the virtual reality display module 110.

As shown in FIG. 1, the secure memory 160 which stores the tokenized payment card identifier 165 is integrated into the virtual reality headset device 100. This allows seamless payment by a user in a virtual reality environment without the requirement for the user to leave the virtual reality environment. Additionally, the use of the tokenized payment card identifier is not tied to a specific communication device, such as a smart phone device. Thus during a virtual reality session, more than one communication device may be used to relay payment transaction authorization requests from the virtual reality headset device 100. This scenario is illustrated in FIG. 2.

Figure 2:
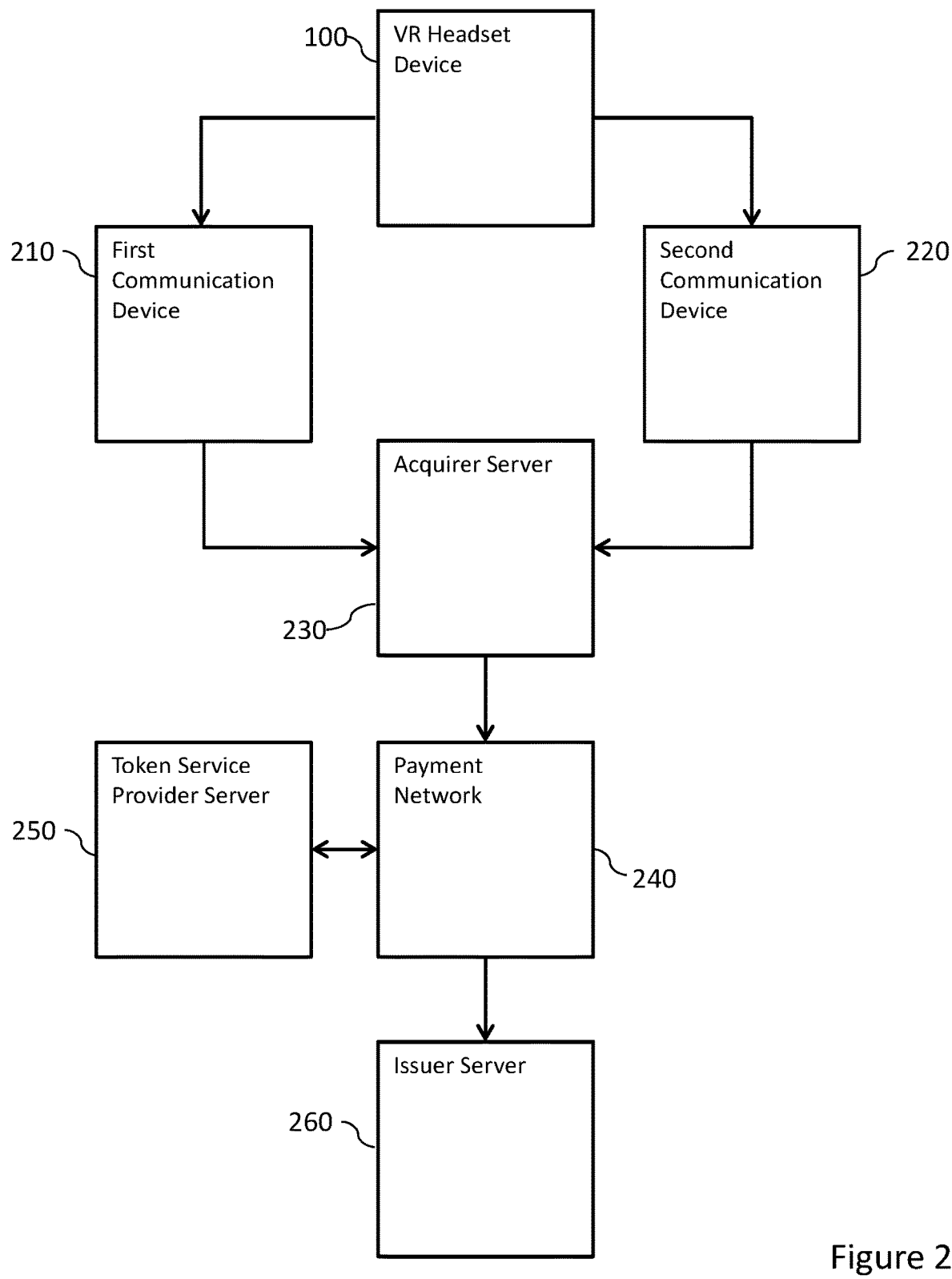
FIG. 2 is a block diagram showing a system comprising a virtual reality headset according to an embodiment of the present disclosure.

FIG. 2 is a block diagram showing a system comprising a virtual reality headset according to an embodiment of the present disclosure. As shown in FIG. 2, the virtual reality headset device 100 is communicatively coupled to a first communication device 210 and/or a second communication device 220. It should be noted that the virtual reality headset device 100 is not necessarily coupled to both the first communication device 210 and the second communication device 220 at the same time. In some scenarios, the virtual reality headset device 100 is first coupled to the first communication device 210 and then later this connection is broken and the virtual reality headset device 100 is coupled to the second communication device 220. The first communication device 210 and the second communication device 220 are any type of computing device which is capable of coupling to the virtual reality headset 100 device via the interface module 120 and also capable of connecting to an external network, for example, the internet. Thus the first communication device 210 and the second communication device 220 may be smart phone devices or personal computing devices and they may be the same type of device or different types of devices.

The first communication device 210 and the second communication device 220 allow a connection to be established to an acquirer server 230. The acquirer server 230 is a server associated with an acquirer bank or similar organization.

The acquirer server 230 is connected to a payment network 240. The payment network 240 is connected to a token server provider server 250 and an issuer server 260. The token service provider server 250 may be part of the payment network 240 or may be provided by the same organization as the issuer server 260, alternatively, the token server provider server 250 may be provided by a separate organization. The token service provider server 250 is coupled to a database which links tokenized payment card identifiers to the corresponding payment card identifiers. The issuer server 260 is the issuing bank or establishment that issued the payment card corresponding to the tokenized payment card identifier 165 stored in the secure memory 160. Communication between the servers may take place via any type of network, for example, a virtual private network (VPN), the Internet, a local area and/or wide area network (LAN and/or WAN), and so on. The payment network 240 may be any payment network such as the Banknet payment network operated by Mastercard®, the VisaNet payment network operated by VISA®, and the RuPay network operated by the National Payments Corporation of India®.

Figure 3:
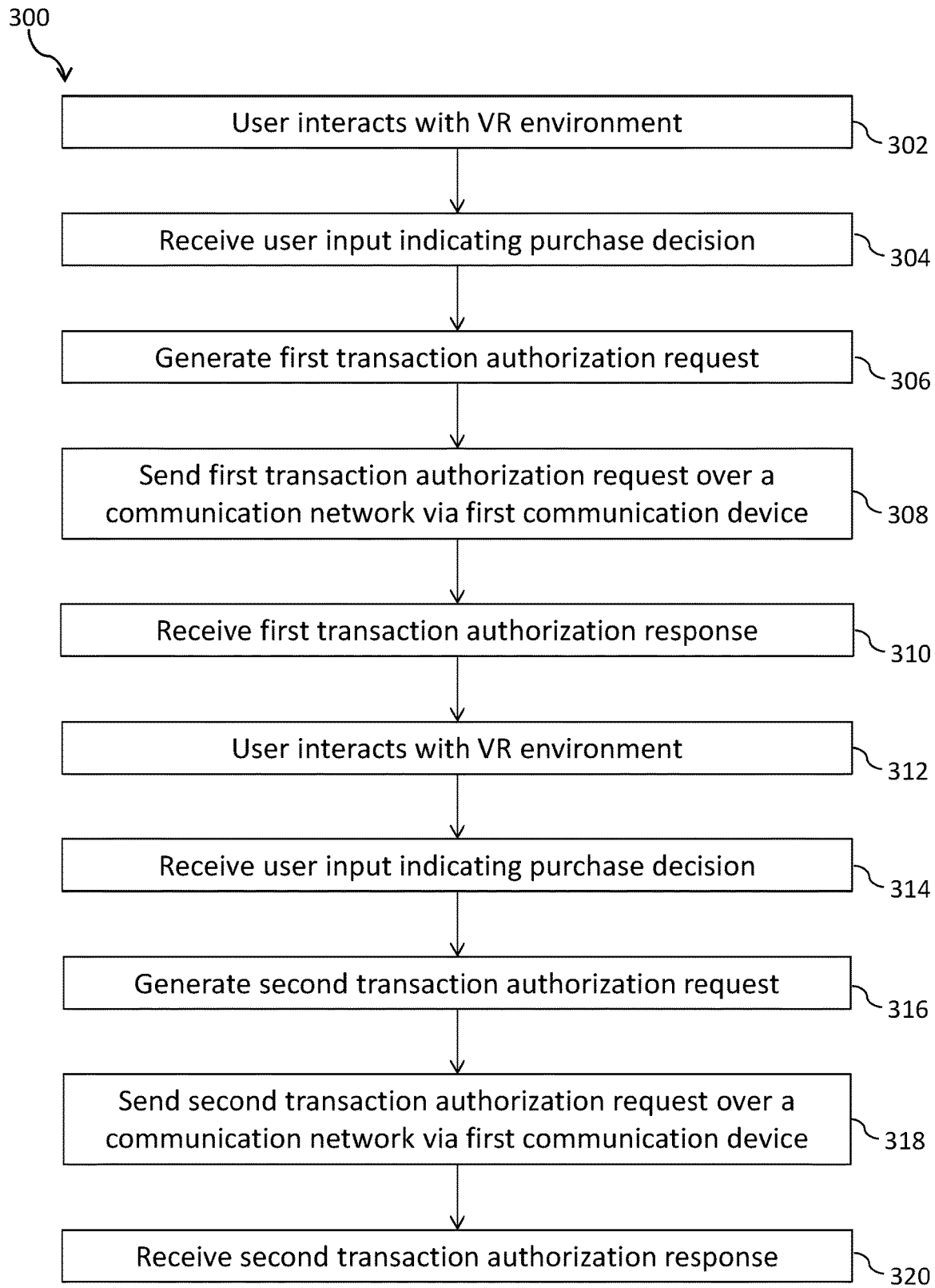
FIG. 3 is a flowchart showing a payment method in a virtual reality headset according to an embodiment of the present disclosure.

The operation of the virtual reality headset device 100 shown in FIGS. 1 and 2 will now be described with reference to FIG. 3. FIG. 3 is a flowchart showing a payment method in a virtual reality headset according to an embodiment of the present disclosure. The method 300 is carried out on by the processor 150 of the virtual reality headset device 100 executing the virtual reality module 172 and the payment module 176 stored in the program memory 170.

In step 302, the user interacts with a virtual reality environment. The virtual reality environment may be, for example, a virtual reality game or an immersive shopping experience. The user is displayed images by the virtual reality display module 110 and the user interacts with the virtual reality environment using the user interface 180. This may involve the user navigating around a virtual reality game environment or an immersive shopping environment.

In step 304, a user input indicating a purchase decision is received. The purchase decision may relate to an in-game purchase when the virtual reality environment is a gaming environment or a decision to check-out when the virtual reality environment is an immersive shopping environment or any other scenario involving a payment. The user provides an input (first input) using the user interface 180 and this input causes the processor 150 to execute the payment module 176 stored in the program memory 170.

In step 306, the payment module 176 running on the processor 150 generates a first transaction authorization request. The method of generating the first transaction authorization request is described in more detail below with reference to FIG. 4. The first transaction authorization request comprises an indication of the transaction amount and an indication of the tokenized payment card identifier 165 stored in the secure memory 160.

In step 308, the interface module 120 of the virtual reality headset device 100 sends the first transaction authorization request over a communication network via the first communication device 210.

Following step 308, the first transaction authorization request is received by the acquirer server 230. The acquirer server 230 sends the first transaction authorization request to the payment network 240. The payment network 240 uses the tokenized payment card identifier 165 in the first transaction authorization request to determine a destination to route the first transaction authorization request. The first transaction authorization request is routed to the token service provider server 250. The token service provider server 250 uses the tokenized payment card identifier 165 to look up the payment card details for the payment card and adds these to the first transaction authorization request. The first transaction authorization request, including the de-tokenized payment card identifier, is then routed by the payment network 240 to the issuer server 260. The issuer server 260 generates a first payment transaction authorization response which indicates whether the first payment transaction is authorized. The first transaction authorization response is routed by the payment network 240 to the acquirer server 230 which sends the payment transaction authorization response to the virtual reality headset device 100 via the first communication device 210.

In step 310, the interface module 120 of the virtual reality headset device 100 receives the payment transaction authorization response. A user indication may be provided by the virtual reality display module 110 indicating that the transaction has been successful. If the virtual reality environment is a gaming environment, the user may be able to access the results of the in-game purchase, for example, an increase in in-game currency or items purchased.

In step 312, the user continues to interact with the virtual reality environment. This may comprise continuing to play the virtual reality game or continuing with the immersive shopping experience.

In step 314, a second user input indicating a purchase decision is received. The purchase decision may relate to an in-game purchase when the virtual reality environment is a gaming environment or a decision to check-out when the virtual reality environment is an immersive shopping environment. The user provides another input (second input) using the user interface 180 and this input causes the processor 150 to execute the payment module 176 stored in the program memory 170.

In step 316, the payment module 176 running on the processor 150 generates a second transaction authorization request. As mentioned above with reference to step 306, the method of generating the second transaction authorization request is described in more detail below with reference to FIG. 4. The second transaction authorization request comprises an indication of the transaction amount and an indication of the tokenized payment card identifier 165 stored in the secure memory 160.

The method 300 relates to a scenario in which the connection between the virtual reality headset device 100 and the first communication device 210 is broken for some reason. This may be due to a change in network connectivity, the battery of the first communication device running out of power, or any other reason. Then, a new connection is established with the second communication device 220. Because the secure memory 160 is located in the virtual reality headset device 100, even when a different communication device is used to make the connection to the payment network 240 a seamless user experience is provided. It is additionally noted that the transmission of the payment transaction authorization requests is agnostic to the operating system or nature of the first communication device 210 and the second communication device 220.

In some embodiments, the user may be shown a list of communication devices and the user may select which communication device is to be used based on various parameters. For example, the second communication device may have low cost internet connection, or based on any other parameters including time, cost, bandwidth, accessibility, availability, battery power, processing power, speed, efficiency, network type, etc. In some embodiments, the selection may be made automatically based on the parameters.

In step 318, the interface module 120 of the virtual reality headset device 100 sends the second transaction authorization request over a communication network via the second communication device 220.

Following step 318, the second transaction authorization request is received by the acquirer server 230. As the later processing and routing of the second transaction authorization request is as described above for the first transaction authorization request and is omitted here. A second transaction authorization response is generated by the issuer server and is routed to the acquirer server 230 and then to the second communication device 220 which sends the second transaction authorization response to the virtual reality headset device 100.

In step 320, the interface module 120 of the virtual reality headset device 100 receives the second payment transaction authorization response. A user indication may be provided by the virtual reality display module 110 indicating that the transaction has been successful. If the virtual reality environment is a gaming environment, the user may be able to access the results of the in-game purchase, for example, an increase in in-game currency or items purchased.

Figure 4:
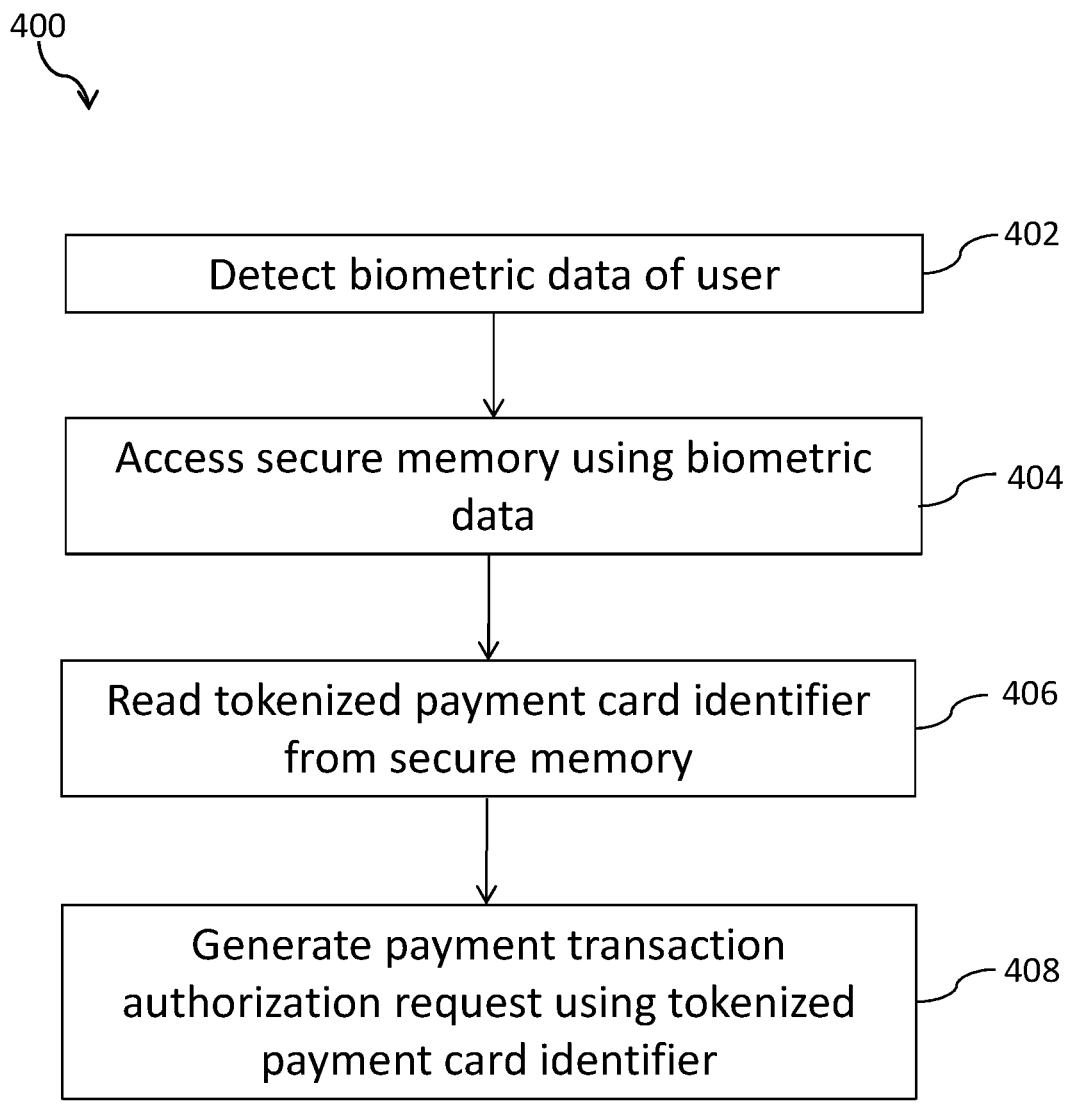
FIG. 4 is a flowchart showing a method of generating a payment transaction authorization request according to an embodiment of the present disclosure.

FIG. 4 is a flowchart showing a method of generating a payment transaction authorization request according to an embodiment of the present disclosure. The method 400 shown in FIG. 4 corresponds to step 306 or step 316 shown in FIG. 3. The method 400 is carried out by the processor 150 of the virtual reality headset device 100 executing the payment module 176 stored in the program memory 170.

In step 402, the biometric sensor 130 of the virtual reality headset device 100 detects biometric data of the user. For example, a user's fingerprint may be detected. Alternatively, retina or iris scanning may be implemented through eye tracking in the virtual reality headset device 100. In alternative embodiments, voice recognition may be used to authenticate the user.

In step 404, the biometric data is used to access the secure memory 160. The biometric data read in step 402 is authenticated by comparing it with stored biometric data for the authorized user of the device. The process of tokenization and storage of the biometric data for the authorized user of the virtual reality headset device 100 is described in more detail below with reference to FIG. 5.

In other embodiments, a different mechanism may be used to access the secure memory 160, for example, a near field communication (NFC) sensor may be used to detect the proximity of a device, such as a mobile device, and this proximity may be used to allow the tokenized payment card identifier 165 to be accessed.

In step 406, the tokenized payment card identifier 165 is read from the secure memory 160.

In step 408, a payment transaction authorization request which corresponds to either the first transaction authorization request or the second transaction authorization request is generated using the tokenized payment card identifier 165. The payment transaction authorization request comprises an indication of the payment transaction amount and an indication of the tokenized payment card identifier 165.

Figure 5:
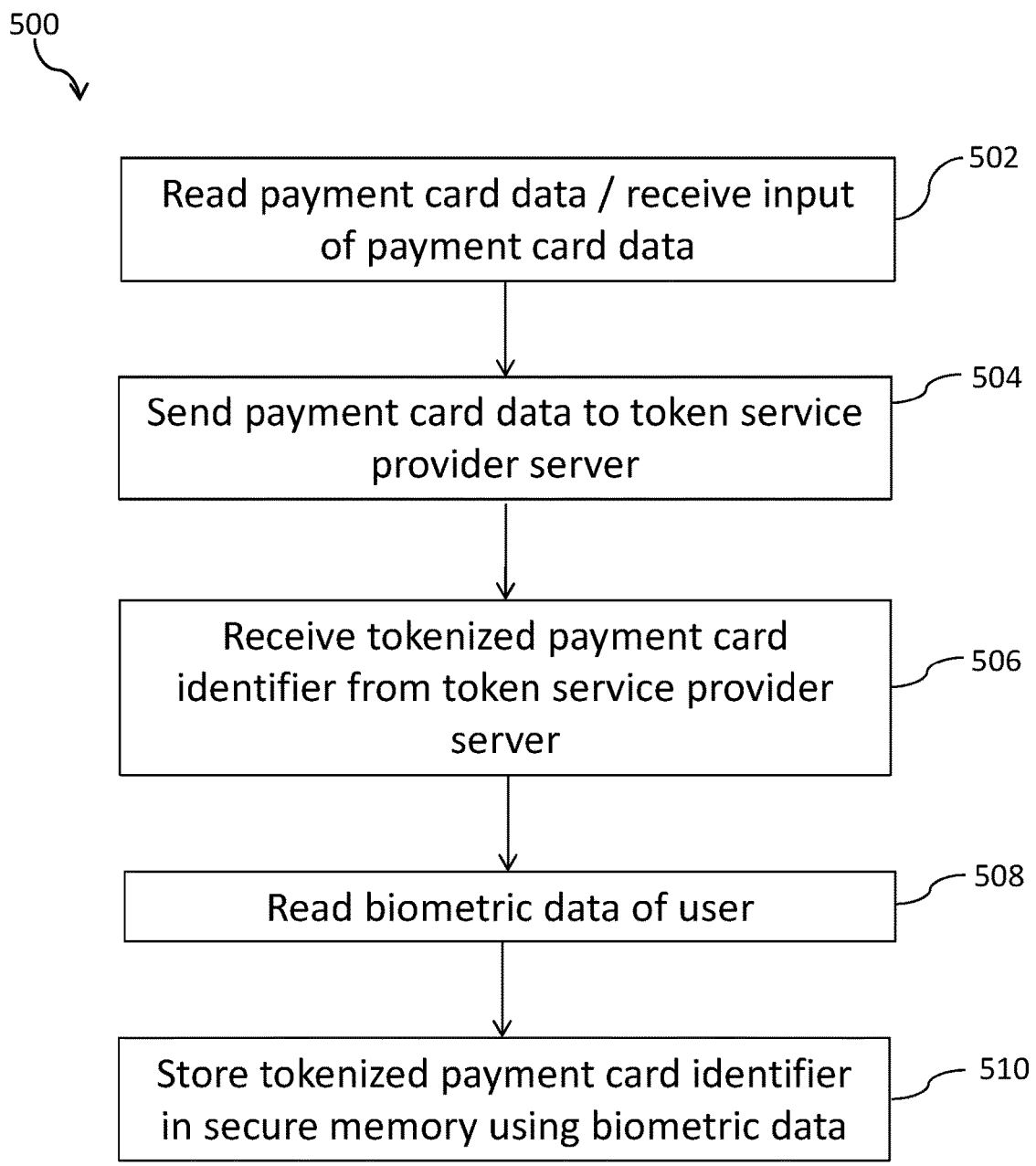
FIG. 5 is a flowchart showing a method of storing a tokenized payment card identifier in an embodiment of the present disclosure.

FIG. 5 is a flowchart showing a method of storing a tokenized payment card identifier in an embodiment of the present disclosure. The method 500 is carried out by the processor 150 of the virtual reality headset device 100 executing the tokenization module 174 stored in the program memory 170.

The method 500 may be triggered by a voice command from the user to store a tokenized payment card.

In step 502, the payment card reader 140 of the virtual reality headset device 100 reads data of a payment card. In some embodiments, the user may input the payment card data, for example, the payment card number, the payment card expiry date and the card security code. In alterative embodiments, the data may be captured by a near field communication (NFC) reader in the virtual reality headset device 100 or by a camera in the virtual reality headset device 100.

In step 504, the payment card data is sent to the token service provider server 250 which stores the payment card data and generates a token which is sent to the virtual reality headset device 100. The communication between the virtual reality headset device 100 and the token service provider server 250 may be encrypted by a cryptographic protocol, such as Secure Sockets Layer (SSL). This encrypted data transfer may take place via one of the first communication device 210 or the second communication device 220.

In step 506, the interface module 120 of the virtual reality headset device 100 receives the token generated by the token service provider server 250.

In step 508, the biometric sensor 130 of the virtual reality headset device 100 reads biometric data of the user, for example, the fingerprint of the user.

In step 510, the tokenized payment card identifier 165 is stored in the secure memory 160 of the virtual reality headset device 100 with the biometric data of the user used to securely store the tokenized payment card identifier 165.

Figure 6:
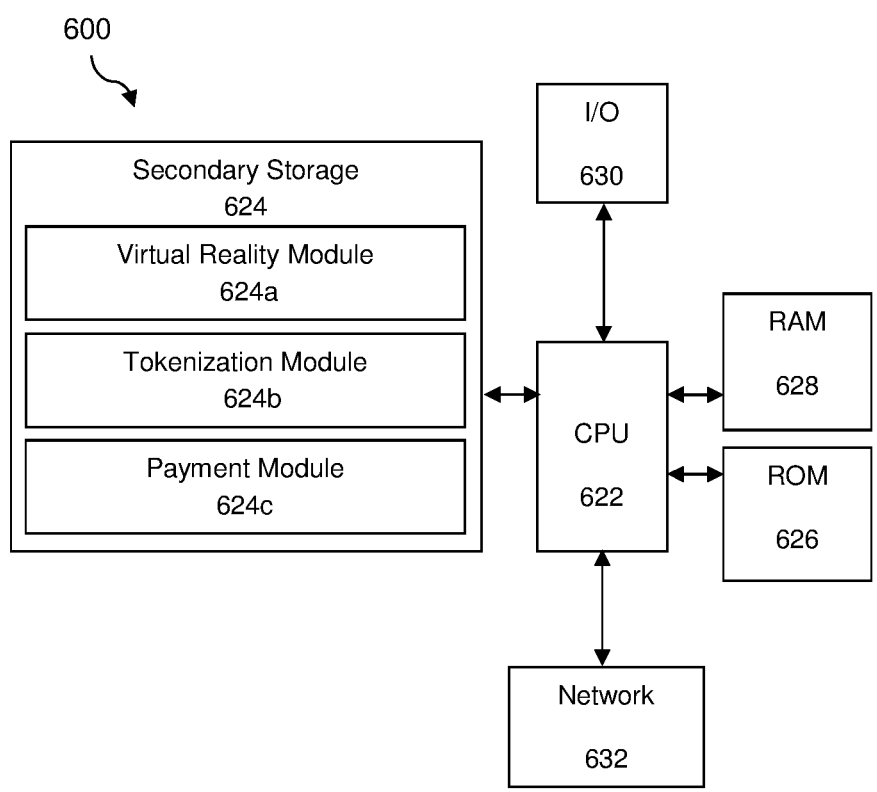
FIG. 6 is a block diagram showing a technical architecture of a virtual reality headset according to an embodiment of the present disclosure.

FIG. 6 is a block diagram showing a technical architecture 600 of the virtual reality headset device 100 for performing steps of exemplary methods described above. Typically, the methods are implemented by a computing device having a data-processing unit. The block diagram, as shown in FIG. 6, illustrates a technical architecture 600 of a computing device which is suitable for implementing one or more embodiments herein.

The technical architecture 600 includes a processor 622 (which may be referred to as a central processor unit or CPU) that is in communication with memory devices, including secondary storage 624 (such as disk drives), read only memory (ROM) 626, random access memory (RAM) 628. The processor 622 may be implemented as one or more CPU chips. The technical architecture 600 may further comprise input/output (I/O) devices 630, and network connectivity devices 632.

The secondary storage 624 is typically comprised of one or more disk drives or tape drives and is used for non-volatile storage of data and as an over-flow data storage device if RAM 628 is not large enough to hold all working data. Secondary storage 624 may be used to store programs which are loaded into RAM 628 when such programs are selected for execution. In this embodiment, the secondary storage 624 has a virtual reality module 624a, a tokenization module 624b, and a payment module 624c, comprising non-transitory instructions operative by the processor 622 to perform various operations of the method of the present disclosure. As depicted in FIG. 6, the modules 624a-624c are distinct modules which perform respective functions implemented by the virtual reality headset device 100. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 624a-624c is described herein, these may alternatively be implemented as one or more hardware modules (such as field-programmable gate array(s) or application-specific integrated circuit(s)) comprising circuitry which implements equivalent functionality to that implemented in software. The ROM 626 is used to store instructions and perhaps data which are read during program execution. The secondary storage 624, the RAM 628, and/or the ROM 626 may be referred to in some contexts as computer readable storage media and/or non-transitory computer readable media.

The I/O devices may include, liquid crystal displays (LCDs), plasma displays, touch screen displays, keyboards, keypads, switches, dials, mice, track balls, voice recognizers, card readers, paper tape readers, or other well-known input devices.

The network connectivity devices 632 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 632 may enable the processor 622 to communicate with the Internet or one or more intranets. With such a network connection, it is contemplated that the processor 622 might receive information from the network, or might output information to the network in the course of performing the method operations described herein. Such information, which is often represented as a sequence of instructions to be executed using processor 622, may be received from and outputted to the network, for example, in the form of a computer data signal embodied in a carrier wave.

The processor 622 executes instructions, codes, computer programs, scripts which it accesses from hard disk, floppy disk, optical disk (these various disk based systems may all be considered secondary storage 624), flash drive, ROM 626, RAM 628, or the network connectivity devices 632. While only one processor 622 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 600, at least one of the CPU 622, the RAM 628, and the ROM 626 are changed, transforming the technical architecture 600, in part, into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made in accordance with the appended claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A virtual reality headset device comprising:
   a virtual reality display configured to display virtual reality images to a user, to thereby generate a virtual reality environment for interaction by the user;
   a secure storage configured to store a tokenized account identifier for a payment card account;
   an interface configured to enable the virtual reality headset device to couple, via a local network, to at least a first personal communication device and a second personal communication device;
   a computer processor; and
   a data storage device, the data storage device storing instructions that, when executed by the computer processor, while the user is in the virtual reality environment, cause the computer processor to:
   generate a first transaction authorization request using the tokenized account identifier for the payment card account;
   select the first personal communication device to facilitate the first transaction authorization request;
   send the first transaction authorization request over a first communication network via the first personal communication device;
   generate a second transaction authorization request using the tokenized account identifier for the payment card accounts
   select the second personal communication device to facilitate the second personal transaction authorization request; and
   send the second transaction authorization request over a second communication network via the second personal communication device.

2. The virtual reality headset device according to claim 1, further comprising a biometric sensor configured to read biometric data of the user; and
   wherein the data storage device stores further instructions that, when executed by the computer processor, cause the computer processor to generate the first and second transaction authorization requests using the biometric data of the user.

3. The virtual reality headset device according to claim 1, further comprising a payment card reader device; and
   wherein the data storage device stores further instructions that, when executed by the computer processor, cause the computer processor to:
   read payment card data using the payment card reader device;
   generate the tokenized account identifier for the payment card account associated with the payment card data; and
   store the tokenized account identifier for the payment card account in the secure storage.

4. The virtual reality headset according to claim 1, wherein the interface is a wireless communication interface; and
   wherein the first communication network is the same as the second communication network.

5. The virtual reality headset device according to claim 1, wherein the virtual reality headset device is configured to receive a computing device comprising a display configured to display virtual reality images to the user.

6. The virtual reality headset device according to claim 1, wherein the first payment transaction authorization request and the second payment transaction request each comprise an indication of a respective transaction amount and an indication of the tokenized account identifier.

7. The virtual reality headset device according to claim 1, wherein the data storage device stores further instructions that, when executed by the computer processor, cause the computer processor to:
   display, at the virtual reality display, to the user in the virtual reality environment, a list including the first personal communication device and the second personal communication device; and
   select either the first personal communication device or the second personal communication device based on a user input indicative of a selection from the list.

8. The virtual reality headset device according to claim 1, wherein the data storage device stores further instructions that, when executed by the computer processor, cause the computer processor to select either the first personal communication device or the second personal communication device based on an indication of connection parameters of the first personal communication device and the second personal communication device.

9. The virtual reality headset device according to claim 1, wherein the data storage device stores further instructions that, when executed by the computer processor, cause the computer processor to:
   receive a first transaction response in response to the first transaction authorization request; and
   generate an indication that the first transaction has been successful.

10. A payment method comprising:
    displaying, at a virtual reality headset device, virtual reality images to a user, to thereby generate a virtual reality environment for interaction by the user;
    while the user is in the virtual reality environment:
    accessing, at the virtual reality headset device, a secure memory within the virtual reality headset device to retrieve a tokenized account identifier for a payment card account;

generating, by the virtual reality headset device, a first transaction authorization request using the tokenized account identifier for the payment card account;

selecting, by the virtual reality headset device, a first personal communication device for the first transaction authorization request;

sending, by the virtual reality headset device, the first transaction authorization request over a first communication network, via a first local connection with the first personal communication device;

generating, by the virtual reality headset device, a second transaction authorization request using the tokenized account identifier for the payment card account;

selecting, by the virtual reality headset device, a second personal communication device for the second transaction authorization request; and sending, by the virtual reality headset device, the second transaction authorization request over a second communication network, via a second local connection with the second personal communication device.

11. The method according to claim 10, further comprising reading biometric data of the user and using the biometric data to access the secure memory.

12. The method according to claim 10, wherein the first personal communication device and the second personal communication device are connected to the virtual reality headset device at different times.

13. The method according to claim 10, wherein the first personal communication device and the second personal communication device are connected to the virtual reality headset device at concurrent times.

14. The method according to claim 10, further comprising:

displaying, to the user in the virtual reality environment, a list including the first personal communication device and the second personal communication device; and receiving a user input indicative of a user selection from the list of either the first personal communication device or the second personal communication device for connection to the corresponding first communication network or second communication network.

15. The method according to claim 10, further comprising receiving an indication of connection parameters of the first personal communication device and the second personal communication device and selecting either the first personal communication device or the second personal communication device for connection to the corresponding first communication network or second communication network based on the connection parameters.

16. The method according to claim 10, further comprising receiving a first transaction response in response to the first transaction authorization request, and generating an indication that a first transaction has been successful.

17. A non-transitory computer readable medium carrying computer executable instructions, which when executed by at least one processor of a virtual reality headset device, cause the at least one processor to:

display, at the virtual reality headset device, virtual reality images to a user, to thereby generate a virtual reality environment at the virtual reality headset device for interaction by the user;

while the user is in the virtual reality environment:

access a secure memory within the virtual reality headset device to retrieve a tokenized account identifier for a payment card account;

generate a first transaction authorization request using the tokenized account identifier for the payment card account;

select a first personal communication device for the first transaction authorization request;

send the first transaction authorization request over a first communication network, via a first local network connection with the first personal communication device;

generate a second transaction authorization request using the tokenized account identifier for the payment card accounts;

select a second personal communication device for the second transaction authorization request; and send the second transaction authorization request over a second communication network, via a second local network connection with the second personal communication device.

18. The method according to claim 10, wherein the first communication network is the same as the second communication network.

19. The method according to claim 17, wherein the first communication network is the same as the second communication network.

* * * * *